No. 811,906. PATENTED FEB. 6, 1906.
J. J. DOSSERT.
ELECTRIC COUPLING.
APPLICATION FILED AUG. 17, 1904.
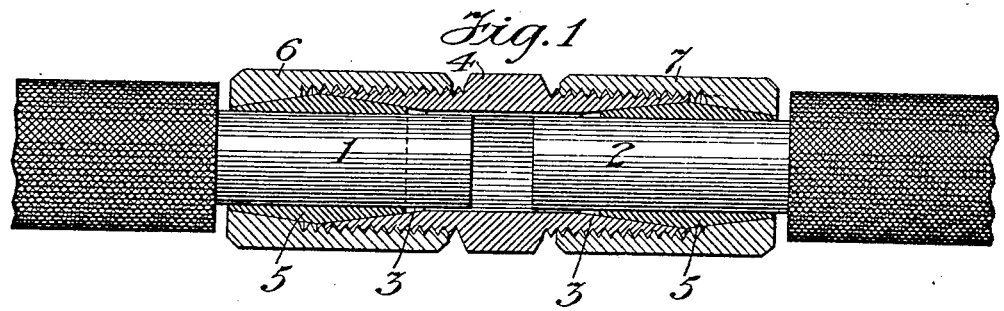
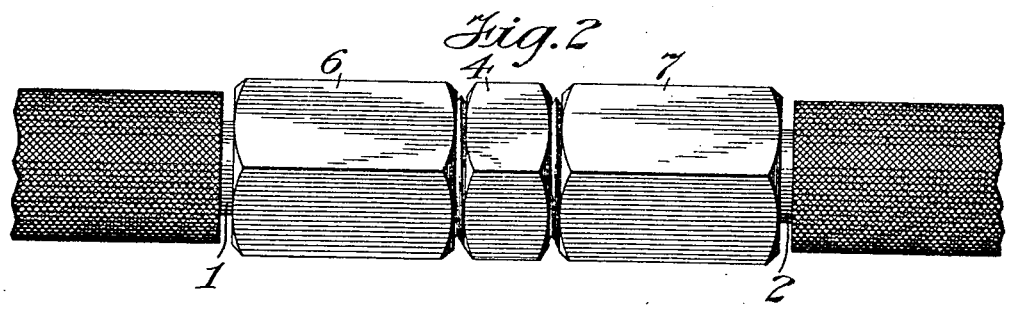
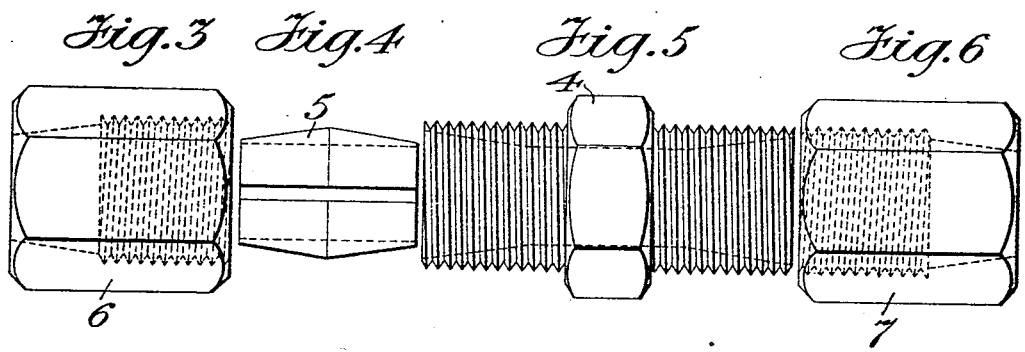
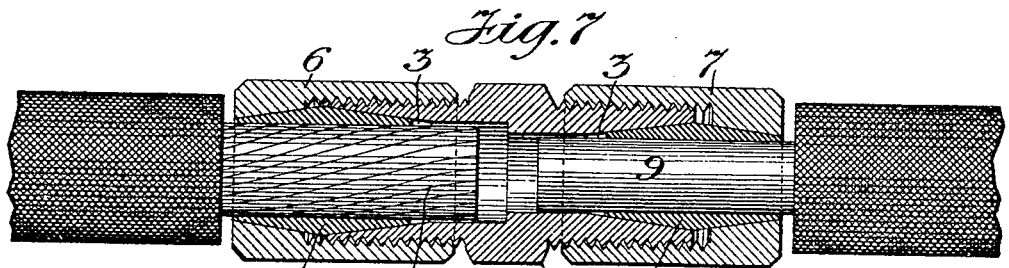
Witnesses
Chas. F. Clagett
Theo. F. Brown
Inventor
John J. Dossert
By his Attorney
George H. Stockbridge

UNITED STATES PATENT OFFICE.

JOHN J. DOSSERT, OF NEW YORK, N. Y., ASSIGNOR TO DOSSERT & COMPANY, A CORPORATION OF NEW YORK.

ELECTRIC COUPLING.

No. 811,906.     Specification of Letters Patent.     Patented Feb. 6, 1906.

Application filed August 17, 1904. Serial No. 221,063.

*To all whom it may concern:*

Be it known that I, JOHN J. DOSSERT, a citizen of the United States, and a resident of New York, county of New York, State of New York, have invented certain new and useful Improvements in Electric Couplers, of which the following is a specification.

The subject of the present invention is a connection or coupler for solid wires or cables the same being adapted to join and form good electrical and mechanical connection for solid wires of the same diameter, solid wires of different diameters, cables of the same diameter, cables of different diameters, or solid wires and cables having the same or different diameters—that is to say, the coupling herein described may form a satisfactory union for electrical conductors of whatever description and of different sizes if for any reason such a union should be desirable. Moreover, the coupling may unite a conductor of either type to an end or terminal connection without being necessarily confined to the joining of the ends of two continuous conducting wires or cables.

The principle upon which the present invention is based is that of using coupling members having tapering interior surfaces in combination with split cones adapted to be compressed inside the said coupling members. The internal diameters of the coupling members will be varied according to the size of the wire or cable to which a given member is to be attached.

By the use of the split-sleeve connection herein described the ends or terminals of two wires or cables of a wire and a cable can be provided with a firm mechanical joint and good electrical connection whether the diameters of the attached or connected wires or cables are the same or different.

I have illustrated my invention in the accompanying drawings, in which—

Figure 1 is a partly-sectional longitudinal view showing two electric wires coupled together at their ends by means of my improved coupling device. Fig. 2 is an elevation of the same. Figs. 3, 4, 5, and 6 are details of different parts of the coupling; and Fig. 7 is a view similar to Fig. 1, illustrating one of my couplings applied to the end of a cable on one side and to a solid wire of smaller diameter on the other side.

In Fig. 1 of the drawings, 1 and 2 are the ends or terminals of two wires which are to be coupled together. The wires are adapted to enter openings 3 3 in an intermediate coupling-piece 4, as shown. The wires also pass through split sleeves having tapering surfaces 5 5, the inner ends of which rest against tapering surfaces on the inside of the coupler 4, such tapering surfaces having the same slope as the exterior of the tapering sleeve 5.

Surrounding both the split sleeve and the intermediate coupling 4 are coupling devices 6 and 7, having at their outer ends sloping internal surfaces corresponding to the outer ends of the split sleeve 5 5. The inner ends of the coupling devices 6 and 7 are screw-threaded to engage with the ends of the intermediate coupler 4.

It is clear that by screwing the coupler 6, for example, tightly upon the coupler 4 pressure will be exerted in a longitudinal direction upon one of the split sleeves 5, which will result in a radial contraction of the said split sleeve, causing it to be pressed tightly against the wire 1. A similar action takes place upon the wire 2 and the split sleeve 5, surrounding the said wire when the coupling device 7 is tightened in the same way.

It will be understood that the screw-threads upon the intermediate coupler are cut in opposite directions, so that the tightening of either of the coupling devices 6 and 7 will tend also to tighten the other coupling device.

I find that by the use of this coupling a very firm mechanical connection can be made between the coupling and the wire to which it is attached, resulting in a strong mechanical construction which will resist great longitudinal strain, while at the same time the electrical continuity of the circuit is thoroughly maintained.

In the last figure of the drawings I illustrate how a cable (shown at 8) may be connected to a wire, (shown at 9.) The action is precisely the same as in the case of coupling two wires or two cables together. Moreover, I show the wire in this instance as of smaller diameter than the cable. This can readily be understood from the drawing itself.

I claim as my invention—

1. A connector for electrical conductors comprising end coupling-sections having conductor-receiving openings, an intermediate coupling-section having a conductor-receiving opening, split sleeves having oppositely-tapered ends housed between each of said end coupling-sections, and said intermediate section, and means for drawing said end sections toward said intermediate section to compress said split sleeves, and force them into close mechanical and electrical contact with conductor ends.

2. A connector for electrical conductors comprising two internally-threaded end coupling-sections having oppositely-tapered bores, an externally-threaded intermediate coupling-section having a bore, the ends of which are oppositely tapered, and two split sleeves having oppositely-tapered ends housed within the tapered bores of said intermediate and end coupling-sections and adapted to be forced into close mechanical and electrical contact with conductor ends when the coupling-sections are drawn together.

Signed at New York, in the county of New York and State of New York, this 16th day of August, A. D. 1904.

JOHN J. DOSSERT.

Witnesses:
GEORGE H. STOCKBRIDGE, Jr.,
THOS. H. BROWN.